United States Patent [19]

Chapelle

[11] 3,924,066

[45] Dec. 2, 1975

[54] ORTHOPRINTER USING NADIR LINE SCANNING

[75] Inventor: Walter E. Chapelle, Southfield, Mich.

[73] Assignee: The Bendix Corporation, Southfield, Mich.

[22] Filed: Feb. 15, 1974

[21] Appl. No.: 442,701

[52] U.S. Cl. .................................. 178/6.7 R; 356/2
[51] Int. Cl.² ........................ H04N 1/04; H04N 1/10
[58] Field of Search ............... 178/6.6 R, 6.7 R, 6.5; 355/52; 356/2; 350/136; 250/558; 33/20 D

[56] References Cited

UNITED STATES PATENTS

| | | | |
|---|---|---|---|
| 2,771,815 | 11/1956 | Nistri | 355/52 |
| 3,054,854 | 9/1962 | Neasham | 178/6.7 R |
| 3,116,555 | 1/1964 | Helava | 33/20 D |
| 3,726,591 | 4/1973 | Helava et al. | 356/2 |

*Primary Examiner*—Raymond F. Cardillo, Jr.
*Attorney, Agent, or Firm*—S. H. Hartz

[57] ABSTRACT

A device for printing an orthophoto from a photograph in which increments on the photograph are scanned and corresponding increments on the orthophoto are printed along nadir lines to simplify the deflection motions so that a laser beam can be used. The simplified nadir line scanning requires image transformations in only one dimension so they can be performed geometrically by a relatively simple digital video processor.

9 Claims, 11 Drawing Figures

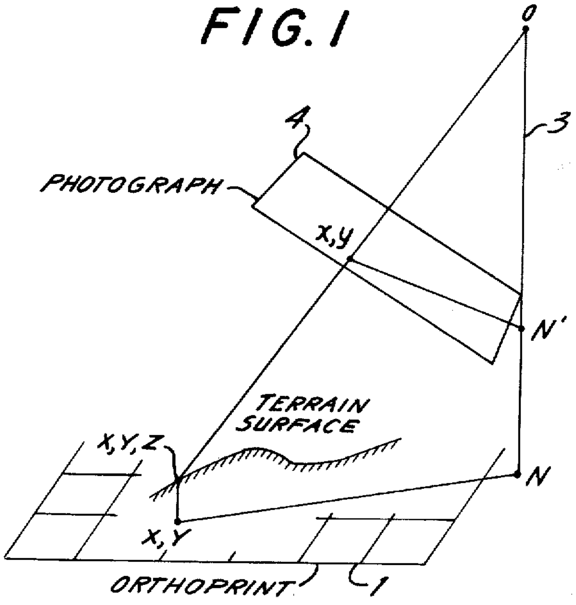
FIG. 2
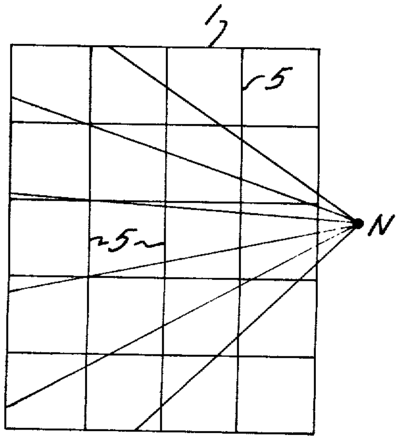
FIG. 3
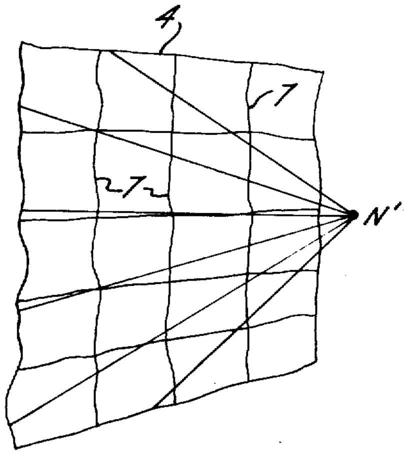
FIG. 4
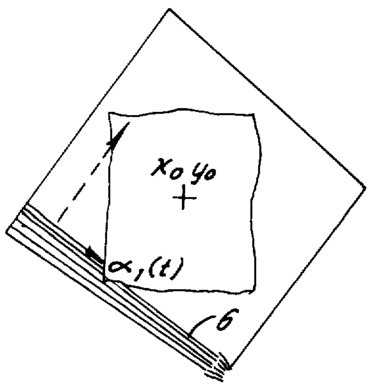
FIG. 5
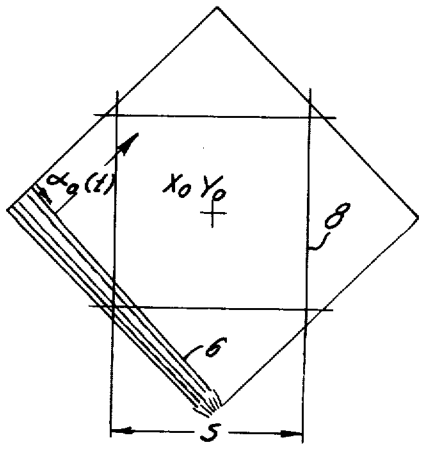

ORTHOPRINTER USING NADIR LINE SCANNING

The invention relates to orthoprinters and, more particularly, to an orthoprinter using a simplified scanning pattern suitable for laser scanning and printing.

Laser scanning is desirable for orthoprinting because the laser beam has resolution capabilities and energy availability to expose high resolution emulsions. However, a laser deflection system with scanning patterns used heretofore is difficult to implement for providing an accurate orthoprint.

In orthoprinters as used heretofore, a television type raster scan is used for the model coordinate printing motions and a synchronized scanning pattern with geometric shaping is used for the photo coordinate motions for geometrical transformations. The scanning motions are quite complex and only a very flexible scanning device, such as a cathode ray tube, is capable of meeting the requirements.

An alternative as used heretofore is the "all digital" approach wherein the entire geometric image transformation is performed by shifting within a two-dimensional digital buffer. The difficulty is that a substantially large buffer capacity is required.

Another alternative used heretofore is the "optical image transfer" orthoprinter wherein increments of the input photograph are sequentially photo copied to the output orthophoto through an optical path which provides variable magnification and rotation. These devices are limited in accuracy because only simple transformations can be made within each increment and, if the increments are made small, the speed may be limited by problems in acceleration of the mechanical stage carrying the photograph.

The present invention uses nadir line scanning to simplify the deflection motions so that a laser beam can be used for accurate orthoprinting. Also, the nadir line scanning permits the image transformations to be performed geometrically by a relatively simple digital video processor by reducing the digital processing requirements from two dimensions to one dimension.

The invention contemplates a device for printing an orthophoto from a photograph with means for scanning the photograph and printing the orthophoto. The invention is directed to controlling the scanning means to scan the photograph along nadir lines and controlling the printing means to print the orthophoto along corresponding nadir lines. For practical reasons the scanning and printing may be limited to increments of the photograph and to corresponding increments of the orthophoto. The increments on the orthophoto are of predetermined shape and size and the increments on the photograph are of corresponding shape and size. The increments on the orthophoto may be square or hexagon or any other suitable shape and may be printed sequentially to fill the desired orthophoto area. Alternatively continuous increments, or strips, may be used in the form of a square spiral, concentric circles, or a circular spiral, or in any other suitable sequence. The scanning control provides rotation signals $\alpha_1$ $(t)$ to the photograph scanning means and $\alpha_0$ $(t)$ to the orthophoto scanning means to maintain alignment with nadir lines. The control means also provides signals $I(t)$ to the printing means for regulating the printing intensity to compensate for non-uniform raster-line spacing. With proper controls within the printing means, positive, negative, or radiometrically corrected orthophotographs may be printed. A digital video processor provides a variable time delay signal $\Delta t(E)$ to the printing means to correct for geometric differences between the photograph and the orthophoto.

One object of the invention is to provide an orthoprinter using a simple scanning pattern requiring only simple deflection motions to permit the use of a laser beam.

Another object of the invention is to use nadir line scanning in which all the lines are radial to the nadir.

Another object is to simplify geometric computations since a change in elevation of a point in the photo causes it to shift only along the photo nadir line and the point is transformed to the object space nadir line simply by shifting the point in one dimension.

Another object of the invention is to limit image transformation geometric computations to one dimension and perform the computations by a digital-video processor or reasonable size.

These and other objects and advantages of the invention will appear more fully hereinafter from a consideration of the detailed description which follows, taken together with the accompanying drawings wherein several embodiments of the invention are illustrated by way of example. It is to be understood, however, that the drawings are for the purpose of illustration only and are not a definition of the limits of the invention, reference being had to the appended claims for this purpose.

In the drawings,

FIG. 1 is a diagram showing the construction of nadir lines,

FIG. 2 shows a model X, Y grid and associated nadir lines,

FIG. 3 shows a corresponding photo grid and associated nadir lines,

Figure 6:
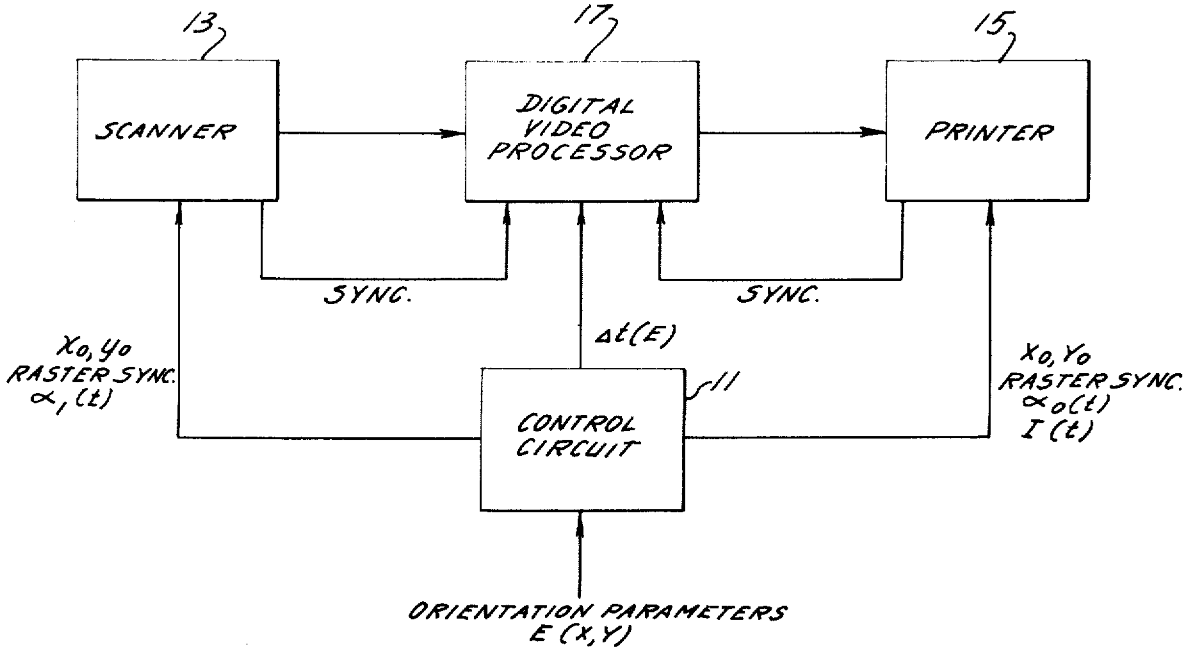
Figure 7:
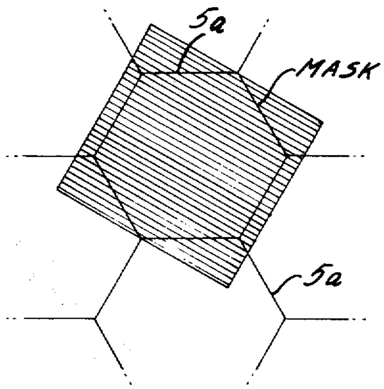
Figure 8:
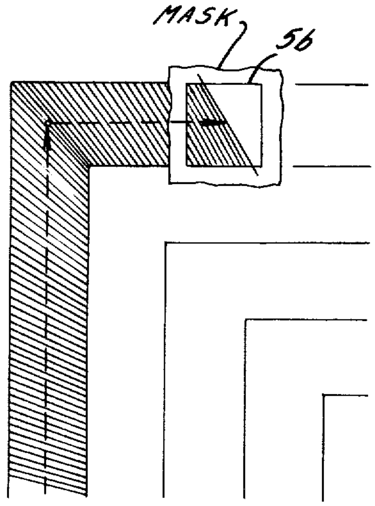
Figure 9:
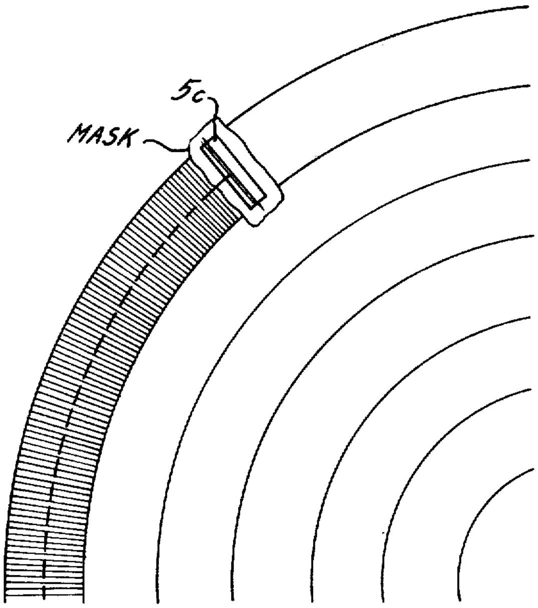
Figure 10:
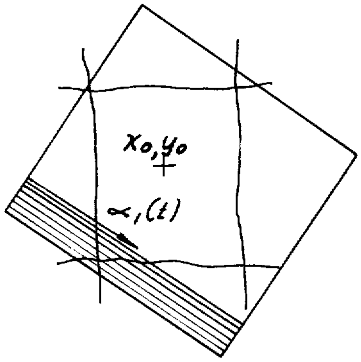
Figure 11:
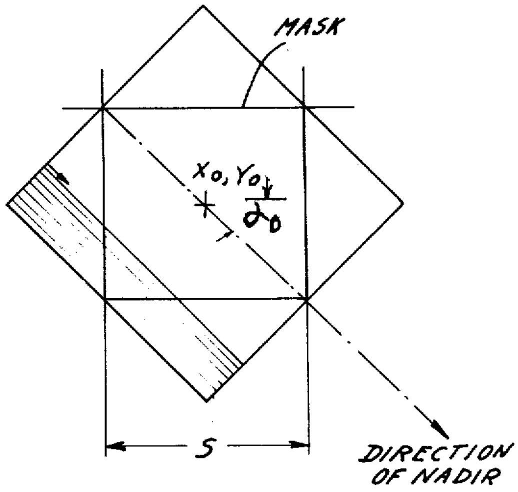

FIG. 4 is a diagram showing the photo coordinate scanning motions for one of the grid increments in FIG. 3, FIG. 5 is a diagram showing corresponding model coordinate printing motions for one of the grid increments in FIG. 2, FIG. 6 is a block diagram of an orthoprinter constructed according to the invention using nadir line scanning, FIG. 7 shows the use of hexagonal printing increments in the grid instead of squares as in FIG. 2, FIG. 8 shows the sequence of printing the increments in the form of a square spiral, FIG. 9 shows the sequence in the form of concentric circles, FIGS. 10 and 11 show approximate nadir line scanning and printing motions using square increments as in FIGS. 4 and 5.

In the present application, the term object space is used to define the three-dimensional X, Y, Z cartesian coordinate system in which the object recorded by a photograph is located. The terms model space or model coordinate system refer to the object space reduced to the approximate scale of the photograph and may be used interchangeably with object space. The orthophoto is generated in a horizontal X, Y reference plane in this space.

Perspective center is the point, nominally the center of the camera lens, through which all rays which form the image can be considered to pass.

Nadir is the point on the X, Y reference plane directly below the perspective center.

The term "orthoprinter" is used synonymously with the terms "orthophotograph printing system" or orthorectification system".

Nadir line scanning is closely related to the well-known physical relationship that relief displacement in a central-perspective photograph is radial from the nadir.

Referring to FIG. 1 the nadir N, the perspective center O and a point X, Y, Z on the surface of the terrain or other object photographed define a vertical plane 3. The intersection of the vertical plane with the horizontal reference plane or orthoprint 1 is referred to as the object space nadir line (XY,N). The intersection of the vertical plane with the photograph 4 is referred to as the photo nadir line (*xy*,N') which contains the images of all points on the intersection of the vertical plane with the terrain surface. Since the plane is vertical, changing the elevation of one of the points causes it to shift only in one dimension along the photo nadir line (*xy*,N') so that an image lying along the photo nadir line can be transformed to the object space nadir line (XY,N) simply by shifting it in one dimension.

As indicated in FIGS. 2 and 3 the entire horizontal reference plane 1 can be traversed by a number of radial nadir lines (XY,N) each with a corresponding photo nadir line (*xy*,N') by selecting a corresponding number of directions $\alpha_0$ in the horizontal reference plane 1. In frame photography the photo nadir lines are straight except for the effects of lens distortion, film shrinkage, etc. In panoramic photography the nadir lines curve, but in most instances they can be approximated by straight lines over reasonably sized printing increments.

In FIG. 2 the horizontal reference plane 1 is divided into an array of square increments 5 and in FIG. 3 the photograph 4 is divided into corresponding increments 7. However, the boundaries of the increments 7 in the photograph appear as wavy lines because of the differences in elevation of the terrain photographed and two opposing boundaries converge because the photograph is tipped in perspective from the vertical. As shown in FIGS. 4 and 5, within each increment a conventional raster scan 6 is used except that rotations $\alpha_1(t)$ modify the photo coordinate scanning motion in FIG. 4 and $\alpha_0(t)$ the model coordinate printing motion in FIG. 5 to maintain alignment with the radial nadir lines. Since these rotations create a variable line density across the increments it is necessary to continuously correct the printing intensity I(*t*). To avoid double exposure or gaps in the orthoprint a mask 8 is used for each increment 5.

The nadir line scanning orthoprinter shown in the block diagram in FIG. 6 has a control circuit 11 which supplies scanning signals to a scanner 13 and synchronized printing signals to a printer 15. Control circuit 11 also supplies rotation signals $\alpha_1(t)$ to scanner 13 and $\alpha_0(t)$ to printer 15 and printing intensity signals I(*t*) to printer 15. Control circuit 11 also provides variable time delay signals $\Delta t$(E) to a digital video processor 17. Scanner 13 is connected to the input of digital video processor 17. The output of the digital video processor is connected to printer 15. Synchronizing signals are provided to the digital video processor 17 by scanner 13 and by printer 15.

The basic function of digital video processor 17 is to apply a variable time delay $\Delta t$(E) to each element of image data as required to implement the photo-model transformation. The video processor also corrects for non-linearities in the scanning and printing motions and preferably produces a constant picture element size and spacing on the orthoprint to avoid radiometric errors. The video processor must contain a word buffer with a capacity of about one-half the number of picture elements in a scan line in order to apply a geometric transformation to the input image to correct for effects of terrain relief and camera geometry.

In making the geometric transformation, the image points must be able to shift in either direction along the nadir line depending on their elevation. Typically, the magnitude of the shift ΔE can be as great as one-half the increment size for steeply sloping terrain which occurs at nadir angles of 45° or greater. The transformation will be of relatively high frequency in areas of rough terrain, especially when increment size is much larger than the desired accuracy. The effects of convergent or panoramic geometry require additional corrections, again typically, up to onehalf the increment size. However, for most photographs and increment sizes presently of interest, a simple affine transformation may be adequate for these effects.

Control circuit 11 is a stored program digital computer, such as the Digital Equipment Corp. PDP 11, programmed to provide the above signals to scanner 13, printer 15 and digital video processor 17. Scanner 13 preferably is of the laser type and may be of the kind shown in FIG. 5 of U.S. Pat. No. 3,726,591 issued Apr. 10, 1973 or as described by Samuel Bousky of the Ampex Corporation, Redwood City, Calif., in a paper entitled Diffraction-Limited Spot Scanning published in Proceedings of the Eighth Annual Electron and Laser Beam Symposium at the University of Michigan by the Institute of Electrical and Electronic Engineers April 6 through 8 — 1966. The scanning line can be rotated to an angle $\alpha_1$ to generate the scanning raster shown in FIG. 4 in the manner described at pages 297–303 in Applied Optics and Optical Engineering by Rudolf Kingslake, Volume III published by Academic Press, New York and London 1965.

Printer 15 may use the same basic hardware as scanner 13 as discussed in the Proceedings of the International Symposium on Photo Maps and Orthophoto Maps held in Ottawa, Canada, Sept. 18 – 22, 1967, reprinted in Canada from the Canadian Surveyor, VOL. XXII, No. 1, March 1968 at pages 12 to 14 Automatic Electronic Orthophoto System, AS-11C by U. V. Helava and at pages 159 to 166 Quality and Potential of UNAMACE Products by Robert P. Macchia. The general organization of scanner, video processor and printer controlled by a control circuit or computer is also described in these references.

Video processor 17 moves the video data a computed amount $\Delta t$ (E) along the nadir line being scanned and printed and may be as described in Bendix Technical Journal, Vol. 5, No. 1, Spring 1972 in the article Digital Processing and Analysis of Image Data by U. V. Helava et al., at page 2 under the subheading Shaping.

While the invention has been described using square increments it should be understood that increments of other shapes may be used. In FIG. 7, for example, the printing increments 5*a* are shown as hexagons. Since the raster is essentially square, there is less wasted area in scanning a hexagonal area at any angle than a square area. In FIG. 8, square increments 5*b* are scanned in the form of a square spiral centered at the nadir. This arrangement has the advantage of continuous motion stopping only at the corners of the square spiral. However, this arrangement requires some input photo stage acceleration capability. In FIG. 9 the increments 5*c* are scanned in concentric circles centered at the nadir. This arrangement minimizes the wasted scan area and requires no stopping. However, both input and output stage acceleration capability is required and processing of the input elevation data is necessary for conversion to polar coordinates. In some instances, instead of concentric circles the increments may be scanned in the form of a circular spiral about the nadir.

In vertical photography, the nadir is likely to fall within the area to be printed. In this case, the printing increment which contains the nadir would require a full 360° scan, and would exhibit an infinite line density at the nadir and a corresponding zero value for $I(t)$. This is not feasible. The simplest alternative which results in negligible error, assuming the increment size is small with respect to the camera focal length, is to ignore the high-order relief displacement in the increment which contains the nadir by using a conventional T.V. raster. Input scan shaping can be applied using $\alpha_1(t)$ to account for photo geometry and average terrain slope.

FIGS. 10 and 11 are directed to an approximate form of nadir line scanning by maintaining $\alpha_0(t)$ constant during each increment and using the proper value for increment center. This eliminates the need for variable printing intensity $I(t)$ since the printing raster line spacing is constant. The input scan rotation of $\alpha_1(t)$ is varied to correct for photogeometry and average terrain slope and the video processor corrects for the component of high-order terrain roughness in the scan direction. The component normal to the scan direction, which exists because scanning is only approximately on nadir lines, is not corrected. The maximum model coordinate error $\epsilon$ introduced by this approximation is:

$$\epsilon = \frac{1}{2} \frac{s}{b_z} \Delta E$$

where $s$ is the increment size, $b_z$ is the flying height in model coordinates and $\Delta E$ is the maximum terrain elevation deviation from the plane of the average terrain slope. The error is independent of the distance from the nadir because the approximation to true nadir line scanning improves with increasing distance from the nadir thus compensating for the greater relief displacement effect. In general, the approximate nadir line scanning shown in FIGS. 10 and 11 limits the size of the printing increment which can be used to less than about 2 to 5 percent of the camera focal length. It is apparent that this arrangement is particularly useful for cameras having a long focal length.

Nadir line scanning allows a substantial relaxation of the scan deflection requirements in comparison to the conventional electronic orthoprinter approach of shaping the input scan. Thus, it allows spinning mirrors, galvanometer mirrors, rotating wedges or other mechanical techniques to be used which otherwise could not be considered. Nadir line scanning also permits the use of a simplified "all digital" approach because the digital processing requirements are reduced from two dimensions as required heretofore to one dimension. The term "along nadir lines" as used in the claims is intended also to include the approximate form of nadir line scanning as described heretofore.

What is claimed is:

1. In a device for printing an orthophoto from a photograph, the device having means for scanning the photograph and means for printing the orthophoto, the improvement comprising means for controlling the scanning and printing means to scan the photograph and print the orthophoto along nadir lines.

2. A device for printing an orthophoto from a photograph as described in claim 1 in which the scanning control means includes means for applying rotation signals to the photograph scanning means and to the orthophoto printing means to maintain alignment with nadir lines.

3. A device for printing an orthophoto from a photograph as described in claim 2 in which the control means includes means for providing signals to the printing means for regulating the printing intensity to compensate for varying printing raster line spacing.

4. A device for printing an orthophoto from a photograph as described in claim 3 which includes a digital video processor connected to the scanning means and to the printing means and controlled by the control means and having means for providing a variable time delay signal to the printing means relative to the photograph scanning means to correct for geometric differences along nadir lines between the photograph and the orthophoto.

5. A device for printing an orthophoto from a photograph as described in claim 1 in which the control means includes means for controlling the scanning and printing means to scan and print corresponding increments on the photograph and orthophoto.

6. A device for printing an orthophoto from a photograph as described in claim 5 in which the increments are elongated strips.

7. A device for printing an orthophoto from a photograph as described in claim 5 in which the increments on the orthophoto are of predetermined shape and size and the increments on the photograph are of corresponding shape and size.

8. A device for printing an orthophoto from a photograph as described in claim 7 in which the increments on the orthophoto are square in shape.

9. A device for printing an orthophoto from a photograph as described in claim 7 in which the increments on the orthophoto are hexagonal in shape.

* * * * *